United States Patent [19]
Yamahira et al.

[11] Patent Number: 5,053,297
[45] Date of Patent: Oct. 1, 1991

[54] NONAQUEOUS ELECTROLYTE SECONDARY BATTERY

[75] Inventors: Takayuki Yamahira; Hisayuki Kato; Masanori Anzai, all of Fukushima, Japan

[73] Assignee: Sony Corporation, Tokyo, Japan

[21] Appl. No.: 502,679

[22] Filed: Apr. 2, 1990

[30] Foreign Application Priority Data

Apr. 3, 1989 [JP] Japan .................................. 1-84541

[51] Int. Cl.$^5$ ...................... H01M 4/52; H01M 10/40
[52] U.S. Cl. .................................. 429/194; 429/218; 429/223
[58] Field of Search ........................ 429/194, 218, 223

[56] References Cited
U.S. PATENT DOCUMENTS 4,751,157 6/1988 Uchiyama et al. .................. 429/194
4,770,966 9/1988 Nagaura et al. .................... 429/194
4,804,596 2/1989 Erner et al. ........................ 429/194

Primary Examiner—Stephen J. Kalafut
Attorney, Agent, or Firm—Hill, Van Santen, Steadman & Simpson

[57] ABSTRACT

A nonaqueous electrolyte secondary battery is disclosed, which comprises an anode having a carbonaceous material as the anode active material which permits lithium to be doped and undoped and a current collector, a cathode having a lithium compound as the cathode active material which permits lithium to be doped and undoped, and a nonaqueous electrolyte. The cathode active material contains the primary active material of a first lithium compound having the potential which is more "noble" than the potential of the current collector and the auxiliary active material of a second lithium compound having the potential which is more "base" than the potential of the current collector. The auxiliary active material works to avoid the dissolution of the anode current collector at the final stage of discharge.

6 Claims, 9 Drawing Sheets

NONAQUEOUS ELECTROLYTE SECONDARY BATTERY

BACKGROUND OF THE INVENTION

The present invention relates to a nonaqueous electrolyte secondary battery which utilizes a carbonaceous material as the anode active material and a lithium compound as the cathode active material.

With the recent remarkable advance in high-performance miniaturized electronic machines such as video camera and headphone stereo, there has arisen a strong demand for a secondary battery having a higher capacity as the power source of these electronic machines. Conventional secondary batteries are lead-acid secondary batteries and nickel-cadmium secondary batteries. Nowadays active development is going on in the nonaqueous electrolyte secondary battery with a high energy density which utilizes lithium metal or lithium compound as the anode active material.

There is the other type of nonaqueous electrolyte secondary battery which utilizes a carbonaceous material as the anode active material and lithium-cobalt oxide ($LiCoO_2$) as the cathode active material. Owing to the doping and undoping of lithium, it prevents the growth of dendrite and the powdering of lithium. Therefore, it has a good cycle life performance and easily meets the requirements for high energy density and high capacity.

The nonaqueous electrolyte secondary battery as mentioned above will be described with reference to FIGS. 1 and 2.

Figure 1:
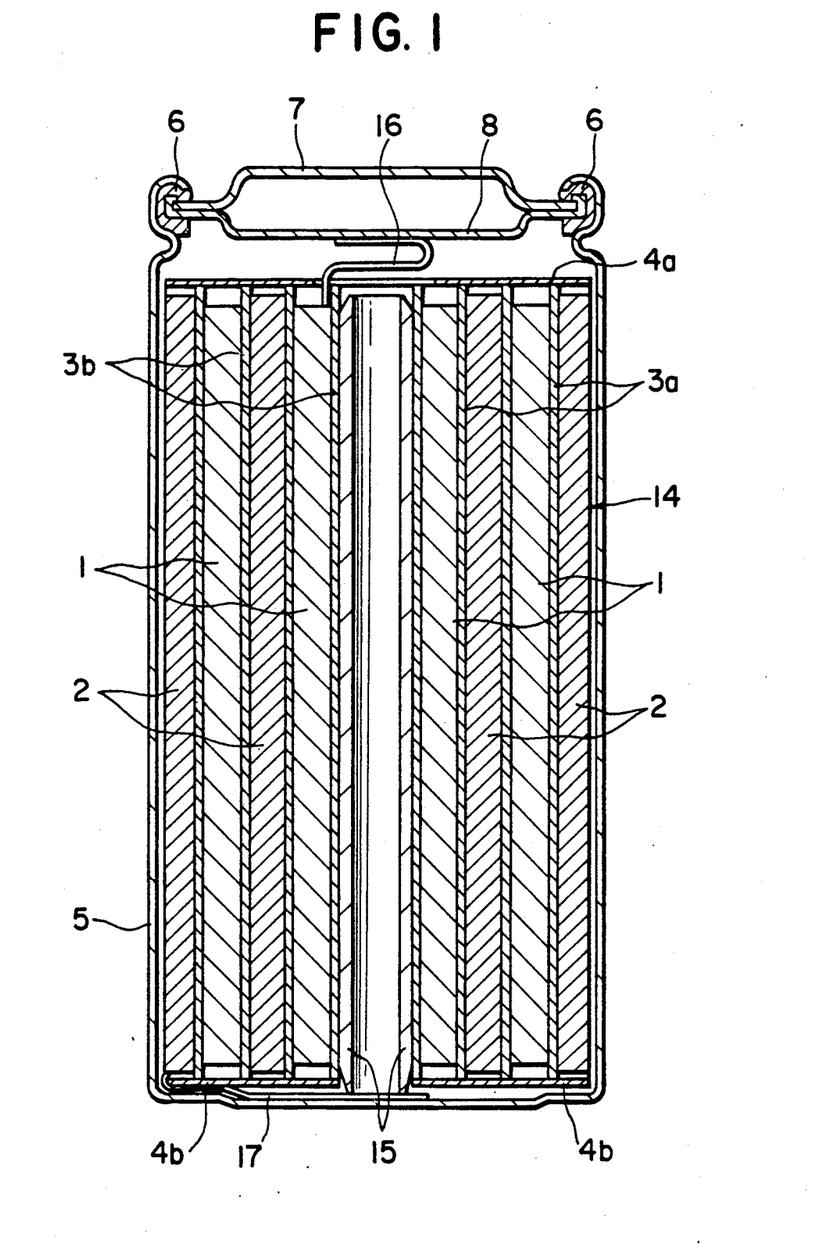
FIG. 1 is a schematic longitudinal sectional view showing a conventional nonaqueous electrolyte secondary battery to which the present invention can be applied.
Figure 2:
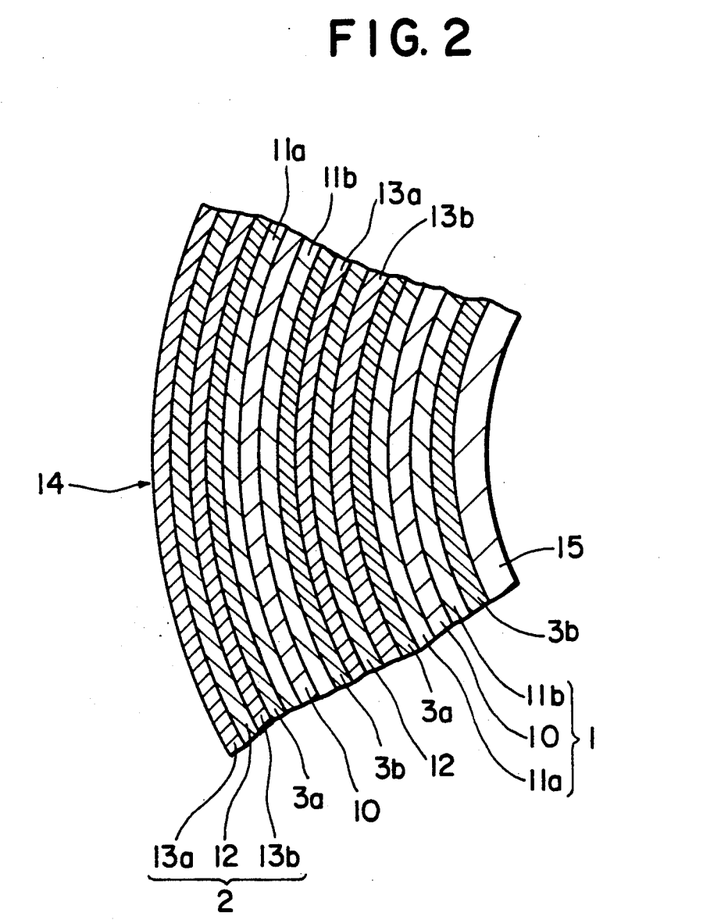
FIG. 2 is a partly enlarged cross sectional view showing the winding as shown in FIG. 1

The nonaqueous electrolyte secondary battery shown in FIGS. 1 and 2 utilizes a carbonaceous material (carbon) as the anode active material and lithium-cobalt oxide ($LiCoO_2$) as the cathode active material. This battery is produced in the following manner.

First, the cathode 1 is prepared as follows: A slurry is made from 91 parts by weight of lithium-cobalt oxide ($LiCoO_2$) as the cathode active material, 6 parts by weight of graphite as the conductor, 3 parts by weight of polyvinylidene fluoride as the binder, and 100 parts by weight of N-methylpyrrolidone as the solvent. This slurry is evenly applied to both sides of a 20-$\mu$m thick aluminum foil as the cathode current collector 10. After drying, the coated foil is pressed using a roller press into a 180-$\mu$m thick beltlike cathode 1. This beltlike cathode 1 consists of the cathode current collector 10 and the cathode active material 11a and 11b in layer form in approximately the same thickness on both sides of the current collector 10. The cathode in each secondary battery may contain 10.4 g of the cathode active material.

Secondly, the anode 2 is prepared as follows: A slurry is made from 90 parts by weight of pitch coke as the anode active material, 10 parts by weight of polyvinylidene fluoride as the binder, and 100 parts by weight of N-methylpyrrolidone as the solvent. This slurry is evenly applied to both sides of a 10-$\mu$m thick beltlike copper foil as the anode current collector 12. After drying, the coated foil is pressed using a roller press into a 180-$\mu$m thick beltlike anode 2. This beltlike anode 2 consists of the anode current collector 12 and the anode active material 13a and 13b in layer form in approximately the same thickness on both sides of the current collector 12. The anode in each secondary battery may contain 4.4 g of the anode active material.

Thirdly, the above-mentioned cathode 1 and anode 2 are wound as many times as required, with a separator interposed between them, to form a winding 14 as shown in FIG. 2.

FIG. 2 is a partly enlarged sectional view of the winding 14 used in the battery as shown in FIG. 1. The winding 14 is formed by winding many times a laminate around the hollow core 15, said laminate consisting of the beltlike cathode 1, the beltlike anode 2, and a pair of separators 3a and 3b which are 25-$\mu$m thick microporous polypropylene film. The layers are arranged in the order of the anode 2, the separator 3a, the cathode 1, and the separator 3b.

Finally, the winding 14 prepared as mentioned above is encased in a battery case 5 as shown in FIG. 1. For current collection from the cathode 1 and anode 2, the cathode 1 is provided with the cathode lead 16 which is welded to the explosionproof valve 8. Similarly, the anode 2 is provided with the anode lead 17 which is welded to the battery case 5. The battery case 5 is filled with an electrolyte prepared by dissolving 1 mol/liter of $LiPF_6$ in a 1:1 (by volume) mixture of propylene carbonate and 1,2-dimethoxyethane, so that the winding 14 is impregnated with the electrolyte. On the top and bottom of the winding are placed the insulating boards 4a and 4b in the battery case. On the explosionproof valve 8 is placed the closing lid 7, with their peripheries in close contact with each other. The periphery is sealed by crimping the edge of the battery case 5, with the gasket 6 interposed. In this way the battery case 5 is closed.

Thus there is obtained a cylindrical nonaqueous electrolyte secondary battery, 20.5 mm in outside diameter and 42 mm in height. Incidentally, the lid 7 has a vent which is not shown in the figure.

This secondary battery should be charged before use because the anode active material is not doped with lithium when it is completed.

The nonaqueous electrolyte secondary battery as mentioned above has a capacity of about 1,040 mAH when charged up to 4.1 V with a constant current of 200 mA and then discharged down to an end voltage of 2.75 V under a load of 7.5 $\Omega$.

It was found that the nonaqueous electrolyte secondary battery as mentioned above becomes poor in charge-discharge characteristics when it undergoes overdischarging. The nonaqueous electrolyte secondary battery of this type is usually examined for charge-discharge characteristics by the test which is conducted under the abovementioned charge-discharge conditions. However, the present inventors subjected several nonaqueous electrolyte secondary batteries to overdischarge until their discharge voltage reaches 0 V. This test was run intentionally assuming that the batteries might be used in an electronics machine which is anomalous or has no cut-off voltage established. Even though the circuit was opened when the discharge voltage reached 0 V, the open circuit voltage was not restored. The batteries which had undergone overdischarge extremely decreased in capacity, and some of the batteries tested could not be charged at all. The charge-discharge characteristics which the secondary battery exhibits after overdischarge down to 0 V are very important for the practical use of the secondary battery. Therefore, it is essential to take measures to prevent the deterioration of the charge-discharge characteristics.

There are proposed in Japanese Patent Laid-open Nos. 228573/1988 and 314778/1988 to incorporate of a compound (such as $MoO_3$, $V_2O_5$, and $TiO_2$) into a cathode active material, such as $MnO_2$. These patents tried to avoid disadvantage caused by the overdischarging, however, these teachings are different from the present invention which will be explained in detail rater.

OBJECT AND SUMMARY OF THE INVENTION

It is an object of the present invention to provide a nonaqueous electrolyte secondary battery which employs a carbonaceous material as the anode active material and a lithium compound as the cathode active material, and yet exhibits superior overdischarging characteristics.

According to one aspect of the present invention, there is provided a nonaqueous electrolyte secondary battery which comprises an anode having a carbonaceous material as the anode active material which permits lithium to be doped and undoped and a current collector, a cathode having a lithium compound as the cathode active material which permits lithium to be doped and undoped, and a nonaqueous electrolyte, in which the cathode active material contains the primary active material of a first lithium compound having the potential which is more "noble" than the potential of the current collector and the auxiliary active material of a second lithium compound having the potential which is more "base" than the potential of the current collector.

DESCRIPTION OF THE PREFERRED EMBODIMENTS

Figure 10:
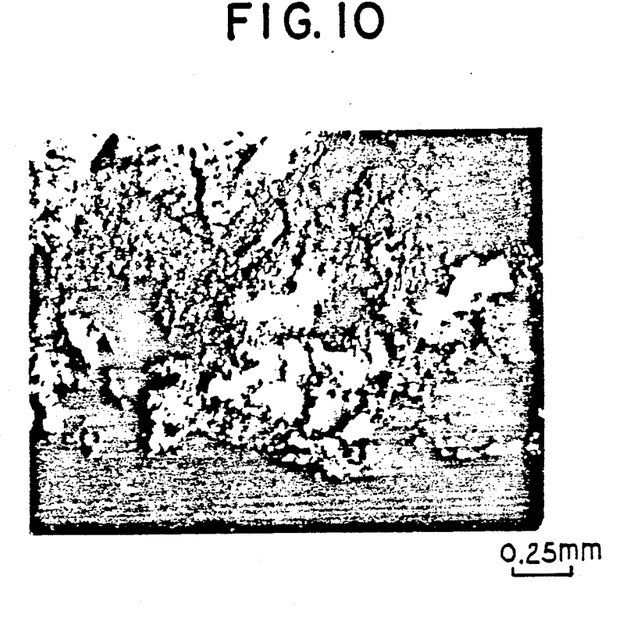
FIG. 10 is a microphotograph of the metal structure of a copper current collector which has deteriorated after overdischarging.

With the foregoing in mind, the present inventors carried out series of researches which led to the findings that the copper foil used as the anode current collector is dissolved in the battery with deteriorate charge-discharge characteristics. A microphotograph of the copper current collector is shown in FIG. 10. It should be noted that the copper current collector is dissolved to such an extent that it does not work any longer.

Figure 9:
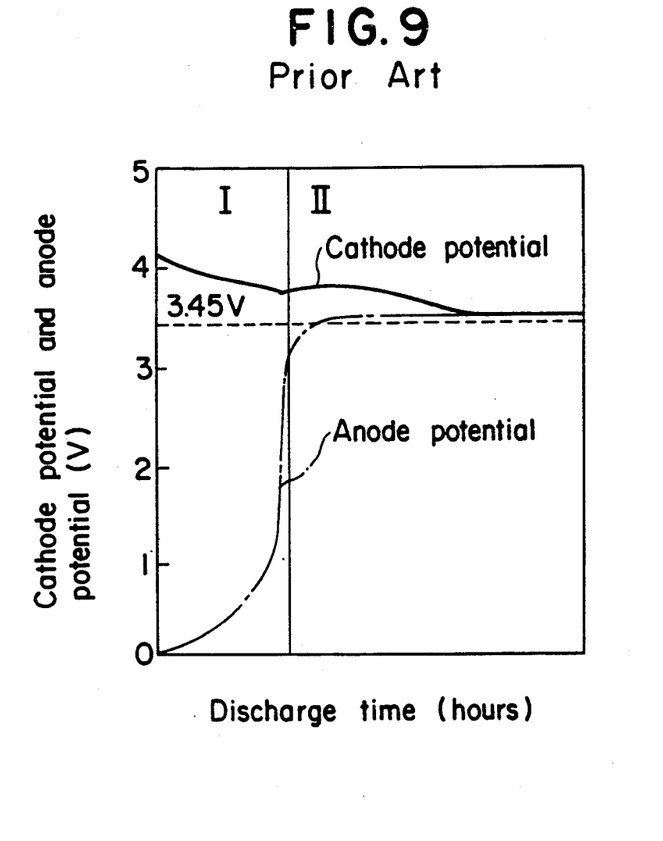
FIG. 9 is a graph showing the discharge characteristic curves of the cathode potential and the anode potential for the cell of prior art.

The mechanism of dissolution of the anode current collector is explained with reference to FIG. 9, which shows how the cathode potential and anode potential measured against a lithium reference electrode change while the above-mentioned secondary battery is discharged. When the charged secondary battery begins to discharge, the anode active material doped with lithium undergoes reaction in the anode and the $LiCoO_2$ undergoes reaction in the cathode. During the reaction, the potential of the cathode gradually changes toward "base" (less noble) and the potential of the anode gradually changes toward "noble" in the region I, as shown in FIG. 9. As the reaction proceeds from region I to region II, the potential of the anode sharply changes toward "noble". At this stage, the anode active material contains only a small amount of lithium left which is capable of discharging. Consequently, the anode active material gradually loses its activity. And the copper constituting the current collector begins to function as the anode active material. As the result, the copper of the current collector and the cathode active material ($LiCoO_2$) form a battery. This is because the cathode active material ($LiCoO_2$) has an extremely "noble" potential of about 4.0 V measured against a lithium reference electrode. This potential brings about the battery reaction between $LiCoO_2$ and copper. In this situation, the copper itself functions as the anode and hence the copper begins to dissolve.

The potential of the anode levels off at about 3.5 V in region II in FIG. 9. On the other hand, the potential of the cathode continues to change toward "base" and finally reaches the same level as the potential of the anode in region II. As the result, the voltage of the battery becomes 0 V. In this situation, the copper current collector dissolves as explained above with reference to FIG. 10. It is known that when copper is used as an electrode of a battery, it dissolves at about 3.45 V measured against a lithium reference electrode. The foregoing exactly coincides with this fact. Incidentally, the battery voltage (difference between the cathode potential and the anode potential) shown in FIG. 9 changes during discharge as indicated by the curve for the prior art battery (0%) in FIG. 3 (which will be explained rater).

Figure 11:
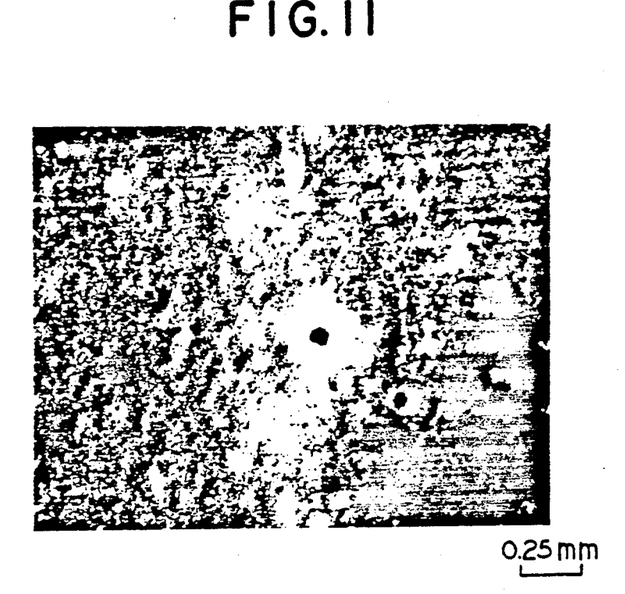
FIG. 11 is a microphotograph of the metal structure of a nickel current collector which has deteriorated after overdischarging.

A similar test to that mentioned above was carried mentioned above except that the anode current collector is nickel foil. The secondary battery was charged and overdischarged (down to 0 V) repeatedly under the same conditions as mentioned above. After five cycles of charging and discharging, the secondary battery came to the end of its life. (This result is better than that with copper.) After removal from the disassembled secondary battery, the nickel current collector was examined for dissolution. Pits due to partial dissolution were found on it, as shown in the microphotograph (FIG. 11).

In the case where nickel foil is used as the anode current collector, the potential of the anode is almost constant at about 3.8–4.0 V in the region corresponding to region II in FIG. 9 explained above. On the other hand, it is known that when nickel is used as an electrode of a battery, it is stable at 4.0 V or below, as measured against a lithium reference electrode. In actual, however, partial dissolution occurred as mentioned above. This is because the potential measured is an average value of potentials and there would be a considerably high (noble) potential locally in the extremely large area of the electrode in the case of an actual battery. For this reason, dissolution takes place in the case of nickel current collector just as in the case of copper current collector mentioned above.

As mentioned above, it was found that nonaqueous electrolyte secondary batteries have an extremely short life when they undergo overdischarging down to 0 V after charging, in the case where they have an anode current collector of copper or nickel. (Copper and nickel are readily available and practical metals which hardly form alloys with lithium.)

The secondary battery disclosed in the aforementioned laid-open patents 228573/1988 and 314778/1988 is different from the above-mentioned one which employs a carbonaceous material as the anode active material. In the latter case, the battery becomes ready for discharging only after lithium is undoped from the cathode active material ($LiCoO_2$) and the undoped lithium is doped into the anode active material as the result of the first charging. Therefore, the amount of lithium undoped from the cathode active material ($LiCoO_2$) is always greater than or equal to the amount of effective lithium to be doped into the anode active material. In other words, in the case of overdischarging, lithium in the anode is exhausted first, or the capacity for the cathode to be doped with lithium is exhausted and lithium in the anode is exhausted simultaneously, with the result that the discharge voltage reaches 0 V. In the former case (where lithium in the anode is exhausted first), the potential of the anode becomes "noble" and the copper or nickel constituting the anode current collector dissolves. In the latter case (where the lithium capacity of the cathode and the lithium in the anode are exhausted simultaneously), there are also possibilities that the cathode current collector will dissolve, because the potential of the cathode is about 3–4 V. Therefore, in the case of the above-mentioned secondary battery which employs a carbonaceous material as the anode active material, the incorporation of $MoO_3$, $V_2O_5$, or $TiO_2$ into the cathode active material (as disclosed in the aforementioned laid-open patents) has nothing to do with the undoping of lithium. The lithium to be undoped by the first charging is that from $LiCoO_2$ alone. What happens in this case is a mere decrease in the ratio of $LiCoO_2$ to the total amount of the cathode active material. This does not differ essentially from what happens in the case of the above-mentioned secondary battery. Therefore, it is not an effective measure for overdischarging.

The present invention overcomes the above problems by a nonaqueous electrolyte secondary battery made up of an anode having a carbonaceous material as the anode active material which permits lithium to be doped and undoped and a current collector, a cathode having a lithium compound as the cathode active material which permits lithium to be doped and undoped, and a nonaqueous electrolyte, in which the cathode active material contains the primary active material of a first lithium compound having the potential which is more "noble" than the potential of the current collector and the auxiliary active material of a second lithium compound having the potential which is more "base" (less noble) than the potential of the current collector.

According to the present invention, the $Li_xCo_{1-y}Ni_yO_2$ ($1 < x > 1$, $0 > y < 0.50$), especially $LiCoO_2$, and the cathode auxiliary active material includes the following lithium compounds.

| | |
|---|---|
| Oxides: | $Li_xMoO_3$ ($0 < x \leq 2$), $Li_xMoO_2$ ($0 < x \leq 1$), $Li_xMo_2O_4$ ($0 < x \leq 2$), $Li_xMnO_2$ ($0 < x \leq 1$), $Li_xMn_2O_4$ ($0 < x \leq 2$), $Li_xV_2O_5$ ($0 < x \leq 2.5$), $Li_xV_3O_8$ ($0 < x \leq 3.5$), $Li_xV_6O_{13}$ ($0 < x \leq 6$ for $Li_xVO_{2.19}$ and $0 < x \leq 3.6$ for $Li_xVO_{2.17}$), $Li_xVO_2$ ($0 < x \leq 1$), $Li_xWO_3$ ($0 < x \leq 1$), $Li_xWO_2$ ($0 < x \leq 1$), $Li_xTiO_2$ (anatase) ($0 < x \leq 1$), $Li_xTi_2O_4$ ($0 < x \leq 2$), $Li_xRuO_2$ ($0 < x \leq 1$), $Li_xFe_2O_3$ ($0 < x \leq 2$), $Li_xFe_3O_4$ ($0 < x \leq 2$), $Li_xCr_2O_5$ ($0 < x \leq 3$), $Li_xCr_3O_8$ ($0 < x \leq 3.8$), $Li_xNi_yCo_{1-y}O_2$ ($0 < x \leq 1$, $0.90 < y \leq 1.00$). |
| Sulfides: | $Li_xV_2S_5$ ($0 < x \leq 4.8$), $Li_xTaS_2$ ($0 < x \leq 1$), $Li_xFeS$ ($0 < x \leq 1$), $Li_xFeS_2$ ($0 < x \leq 1$), $Li_xNbS_3$ ($0 < x \leq 2.4$), $Li_xMoS_3$ ($0 < x \leq 3$), $Li_xMoS_2$ ($0 < x \leq 1$), $Li_xTiS_2$ ($0 < x \leq 1$), $Li_xZrS_2$ ($0 < x \leq 1$), $LixFe_{0.25}V_{0.75}S_2$ ($0 < x \leq 1$), $Li_xCr_{0.75}V_{0.25}S_2$ ($0 < x \leq 0.65$), $Li_xCr_{0.5}V_{0.5}S^2$ ($0 < x \leq 1$). |
| Selenides: | $Li_xNbSe_3$ ($0 < x \leq 3$), $Li_xVSe_2$ ($0 < x \leq 1$). |
| Others: | $Li_xNiPS_3$ ($0 < x \leq 1.5$), $Li_xFePS_3$ ($0 < x \leq 1.5$). |

Oxides are preferable from the standpoint of cost. More desirable among them are vanadium compounds ($Li_xV_2O_5$, $Li_xV_3O_8$, $Li_xV_6O_{13}$, and $Li_xVO_2$), manganese compounds ($Li_xMnO_2$ and $Li_xMn_2O_4$), and molybdenum compounds ($Li_xMnO_3$ and $Li_xMoO_2$). These compounds should preferably have the value of x greater than 5. The auxiliary active material should be used in an amount of 1–30 wt%, preferably 2–20 wt%, of the total amount of the cathode active material.

The secondary battery of the present invention should have as the anode active material a cheap carbonaceous material which is free of lithium and has a high capacity for lithium to be doped. The carbonaceous material is selected from among pyrolyzed carbon, coke (pitch coke, needle coke, petroleum coke, etc.), graphite, glass-like carbon, calcined organic polymer (carbonized product formed by calcining phenolic resin, furan resin, etc. at an adequate temperature), carbon fiber, and active carbon, which permits lithium to be doped and undoped.

The secondary battery of the present invention should have an anode current collector made of a metal which does not form an alloy with lithium. Preferred examples of such a metal include copper and nickel. The current collector may be placed with copper or nickel.

The secondary battery of the present invention should have a nonaqueous electrolyte which is formed by dissolving one or more of the following electrolytes in one or more of the following electrolytic solutions.

Examples of electrolytes: $LiClO_4$, $LiAsF_6$, $LiPF_6$, $LiBF_4$, $LiB(C_6H_5)$, $LiCl$, $LiBr$, $CH_3SO_3Li$, and $CF_3SO_3Li$.

Examples of electrolytic solutions: Propylene carbonate, ethylene carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, acetonitrile, and propionitrile.

The above-mentioned nonaqueous electrolyte may be solid, in which case a polymer complex electrolyte is preferable. A solid electrolyte may be obtained by dissolving $(PEO)_{4.5}$-$LiBF_4$ or $(PEO)_9$-$LiCF_3SO_3$ (a combination of polyethylene oxide and one of the above-mentioned electrolytes) in an organic solvent to give a gel, and drying the gel in a desired form.

The secondary battery of the present invention has a cathode active material which consists of a first lithium compound (primary active material) having the potential which is more "noble" than the potential of the anode current collector and a second lithium compound (auxiliary active material) having the potential which is more "base" than the potential of the anode current collector. This constitution permits lithium to be undoped from both of the cathode primary active material and the cathode auxiliary active material and also permits lithium to be supplied to the anode at the time of charging. Consequently, the amount of lithium doped to the anode exceeds the lithium capacity of the cathode primary active material (a first lithium compound).

Subsequently, at the time of discharging, the cathode primary active material is doped with lithium for discharging and then the cathode auxiliary active material is doped with lithium for discharging. Therefore, the lithium in the anode is not exhausted even after the cathode primary active material has almost completed discharging, and the cathode auxiliary active material continues discharging. Even when the lithium capable of discharging is exhausted from the anode, the anode current collector does not function like the anode active material because the potential of the cathode auxiliary active material is more "base" than the potential of the anode current collector. Therefore, the anode current collector does not form a battery with the cathode active material, and hence the dissolution of the anode current collector does not take place.

EXAMPLE 1

The example of the present invention will be described with reference to FIGS. 1 to 8.

In the example, a nonaqueous electrolyte secondary battery as shown in FIGS. 1 and 2 was prepared in the same manner as explained in the section of prior art, except that the cathode 1 was prepared in the following manner.

First, $Li_xMoO_3$ ($x=1-2$) as the cathode auxiliary active material was prepared as follows: 35 g of $MoO_3$ (reagent) was reacted with n-butyllithium (in the form of 15% solution in 250 mL of hexane) in 100 mL of hexane. After filtration, the resulting solution was vacuum-dried at 160° C. for 8 hours. There was obtained a black powder. The X-ray diffractometry of this powder gave a diffraction pattern which is apparently different from that of $MoO_3$. This indicates the formation of $Li_xMoO_3$ in consequence of the reaction of $WoO_3$ with n-butyllithium. The value of x is estimated at about 1.55. Subsequently, the thus obtained $Li_xMoO_3$ was mixed with $LiCoO_2$ as the anode primary active material in a ratio of 15:85 by weight. The resulting compound was used as the anode active material to form the anode 1 in the same manner as mentioned above.

The nonaqueous electrolyte secondary battery having the cathode 1 is designated as C hereinafter.

To confirm the effect of the present invention, six kinds of nonaqueous electrolyte secondary batteries designated as A, B, D, E, F and G were produced in the same manner as mentioned above except that the ratio of $Li_xMoO_3$ (cathode auxiliary active material) and $LiCoO_2$ (cathode primary active material) was changed as shown in Table 1.

TABLE 1

| Battery | $Li_xMoO_3$ (wt %) | $LiCoO_2$ (wt %) |
|---------|-------------------|------------------|
| A | 5 | 95 |
| B | 10 | 90 |
| C | 15 | 85 |
| D | 20 | 80 |
| E | 25 | 75 |
| F | 30 | 70 |
| G | 35 | 65 |

Figure 3:
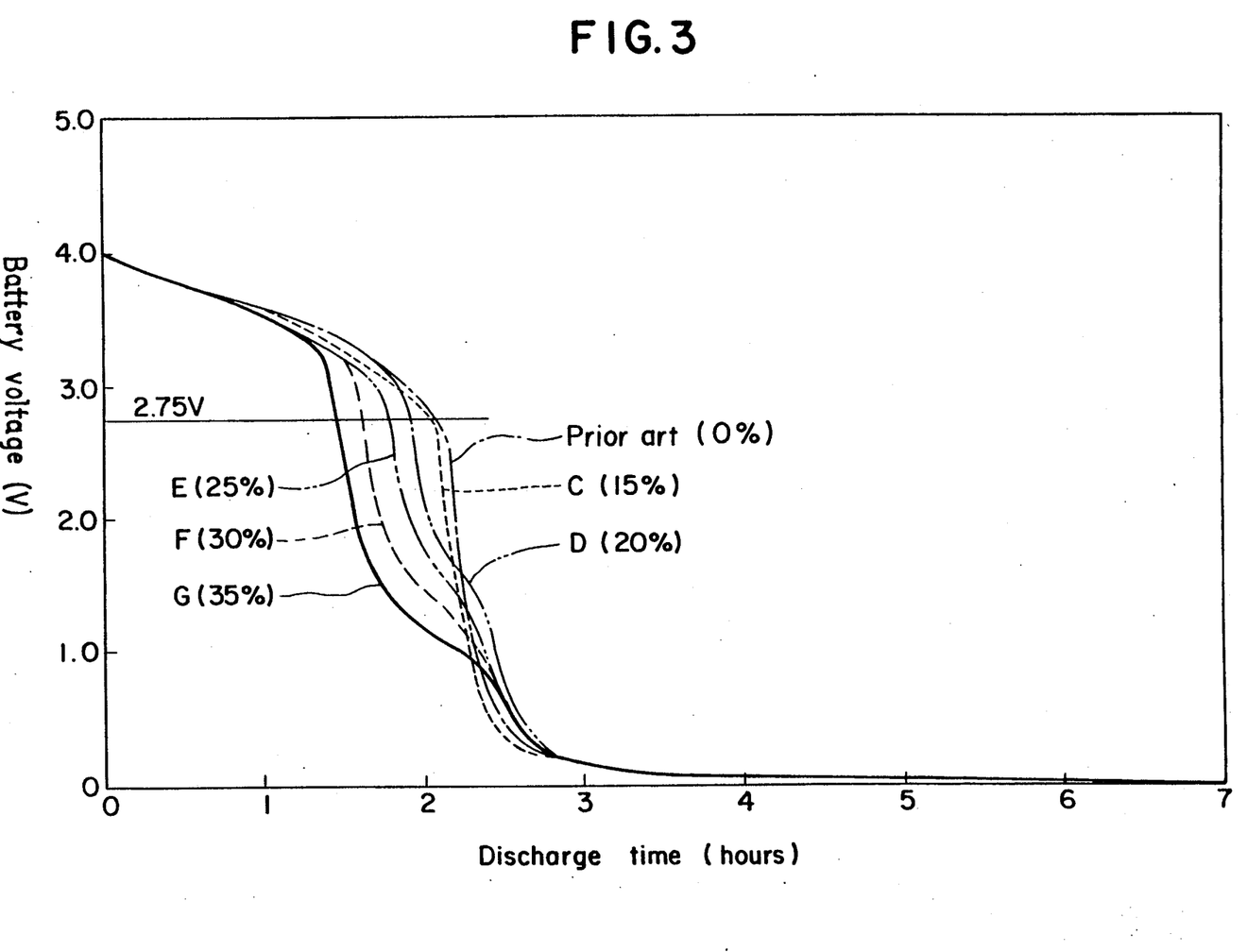
FIG. 3 is a graph showing the discharge characteristic curves of the nonaqueous electrolyte secondary batteries of prior art type and pertaining to the example of the present invention.

The thus obtained seven kinds of nonaqueous electrolyte secondary batteries designated as A to G were charged up to 4.1 V with a constant current of 200 mA and then discharged down to 0 V under a load of 7.5 Ω. Their discharge characteristic curves are shown in FIG. 3. For the purpose of reference, there is also shown in FIG. 3 a discharge characteristic curve of a conventional nonaqueous electrolyte secondary battery in which the cathode primary active material ($LiCoO_2$) accounts for 100% and the cathode auxiliary active material is not used. Incidentally, the discharge characteristic curves of the secondary batteries A and B are not shown in FIG. 3 because they are substantially identical with those of prior art secondary batteries.

It is noted from FIG. 3 that the secondary batteries A, B, and C, in which the amount of the auxiliary active material is less than 15 wt%, give discharge characteristic curves which are almost identical with those of secondary batteries in which no auxiliary active material is added. It is also noted that there is no significant difference in battery capacity. However, as the amount of the auxiliary active material exceeds 20 wt%, the battery capacity remarkably decreases. The voltage of the secondary batteries tested decreased to almost 0 V after discharging for about 5 hours. This indicates that the secondary batteries are in the state of overdischarge.

Figure 4:
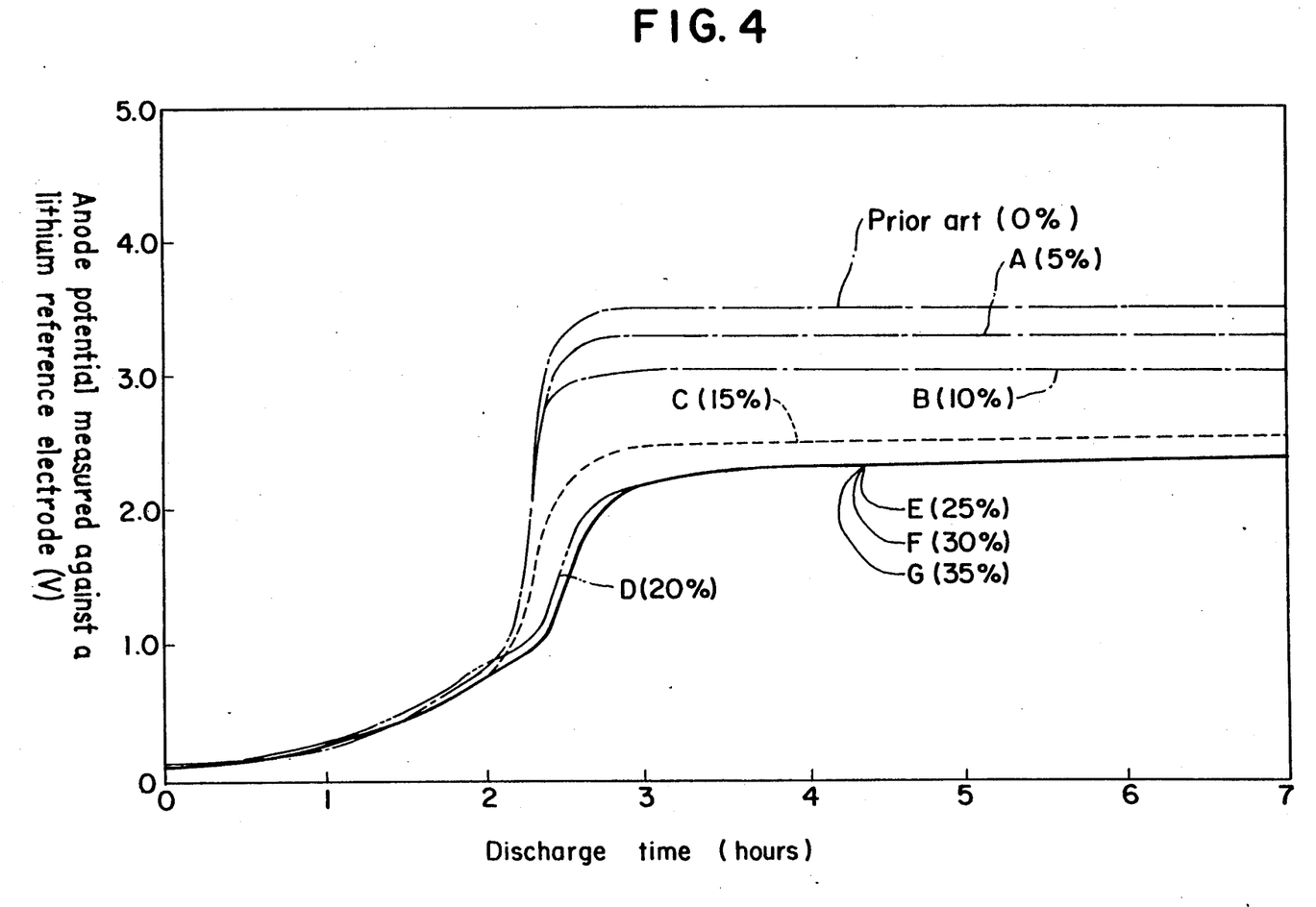
FIG. 4 is a graph showing the discharge characteristic curves of the anode potential measured against a lithium reference electrode.

The above-mentioned seven kinds of secondary batteries give the discharge characteristic curves of the anode potential measured against a lithium reference electrode, as shown in FIG. 4. It is noted that the anode potential becomes saturated and levels off about 5 hours after the state of overdischarging has occurred. Incidentally, percent in FIGS. 3 and 4 denotes the amount (wt%) of the auxiliary active material shown in Table 1.

Figure 5:
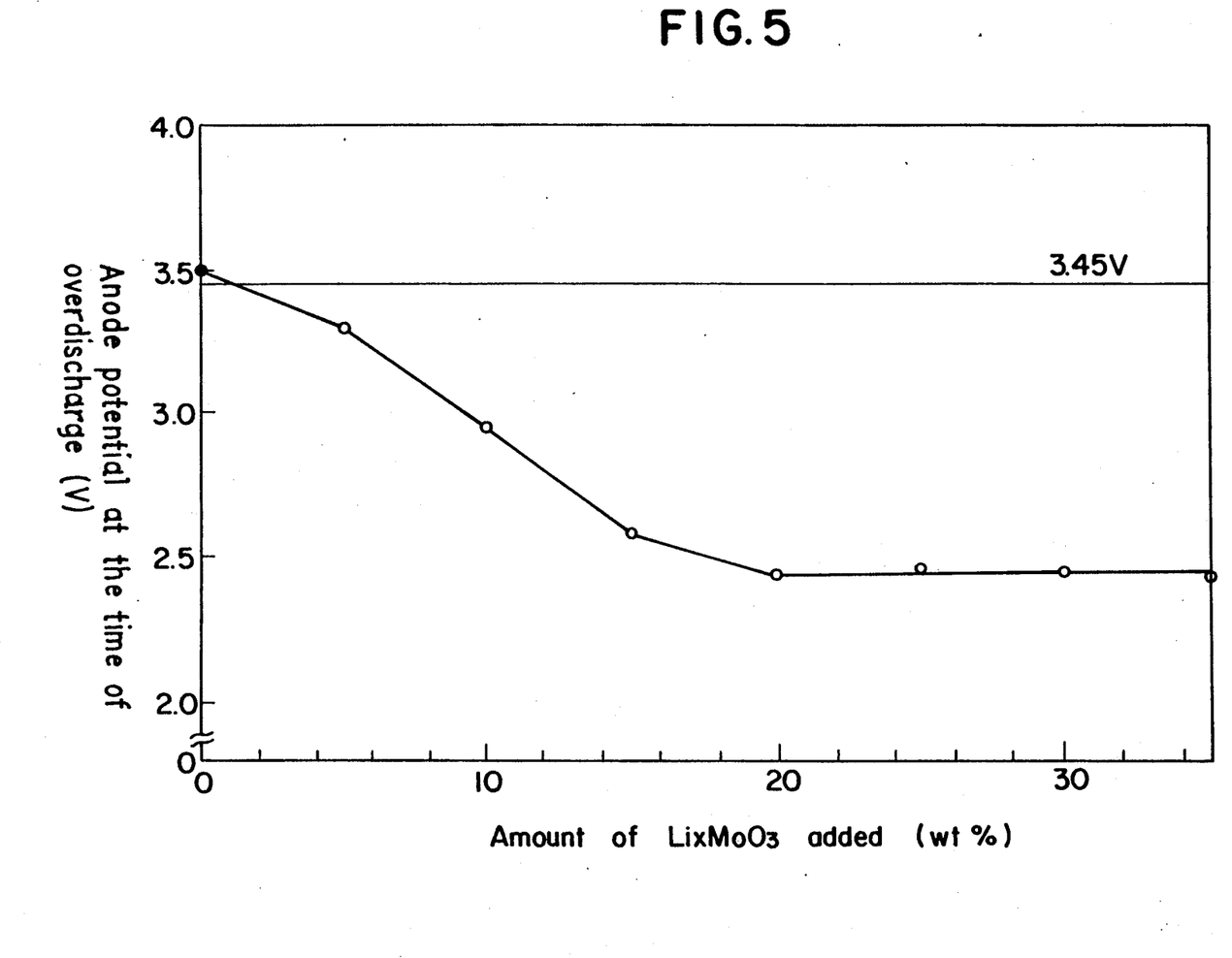
FIG. 5 is a graph showing the relation between the amount of $Li_xMoO_3$ added and the anode potential at the time of overdischarge.

The amount of the auxiliary active material ($Li_xMoO_3$) affects the anode potential in case of overdischarge as shown in FIG. 5.

It is noted from FIGS. 4 and 5 that as the amount of the auxiliary active material increases, the anode potential in case of overdischarge becomes "base", and when the amount of the auxiliary active material exceeds 20 wt%, the anode potential become almost constant. It is also noted from FIG. 5 that when the auxiliary active material is added more than 1 wt%, or more than 2 wt% to be more specific, the anode potential becomes more "base" than the potential (+3.45 V) at which copper dissolves.

Figure 6:
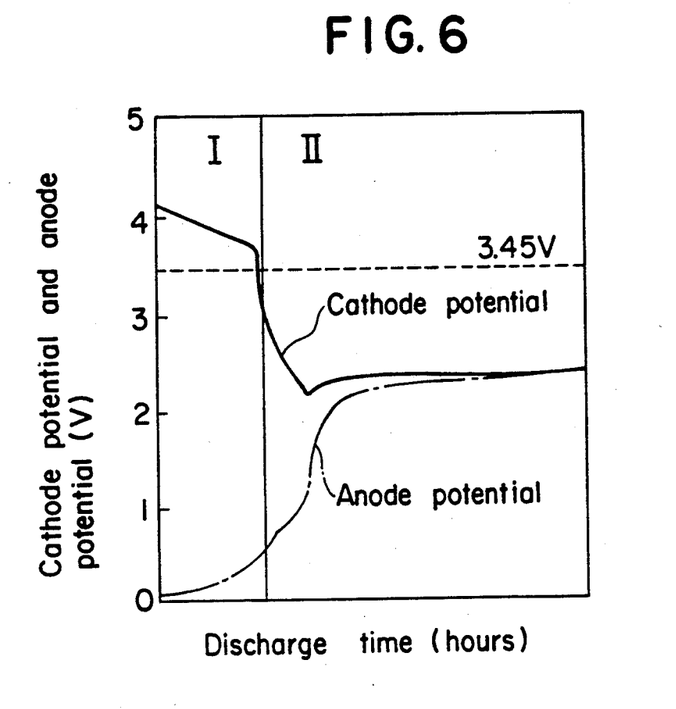
FIG. 6 is a graph showing the discharge characteristic curves of the cathode potential and anode potential of the battery E prepared in the example of this invention.

The above-mentioned secondary battery designated as E gives the discharge characteristic curves of the anode potential and the cathode potential, measured against a lithium reference electrode, as shown in FIG. 6. It is noted from FIG. 6 that in region I, the cathode potential changes in almost the same manner as shown in region I in FIG. 9 for the cell without auxiliary active material. However, in region II, the cathode potential rapidly changes toward "base". The border across which a sharp transition takes place corresponds to the time almost exhausted and then the auxiliary active material ($Li_xMoO_3$) having the potential which is more "base" than the primary active material begins discharging. In the case of FIG. 6, the anode potential does not change so rapidly across region I and region II as in the case of FIG. 9. This is because the anode active material still retains lithium even after the cathode primary active material has almost completed discharging in region II, and this lithium continues to react with the auxiliary active material. Even though the reaction of lithium in the anode active material with the auxiliary active material is almost completed and the state of overdischarging has occurred, the auxiliary active material keeps the potential which is more "base" than the copper of the anode current collector. Therefore, the anode potential does not change toward "noble", reaching the potential at which copper dissolves.

Figure 7:
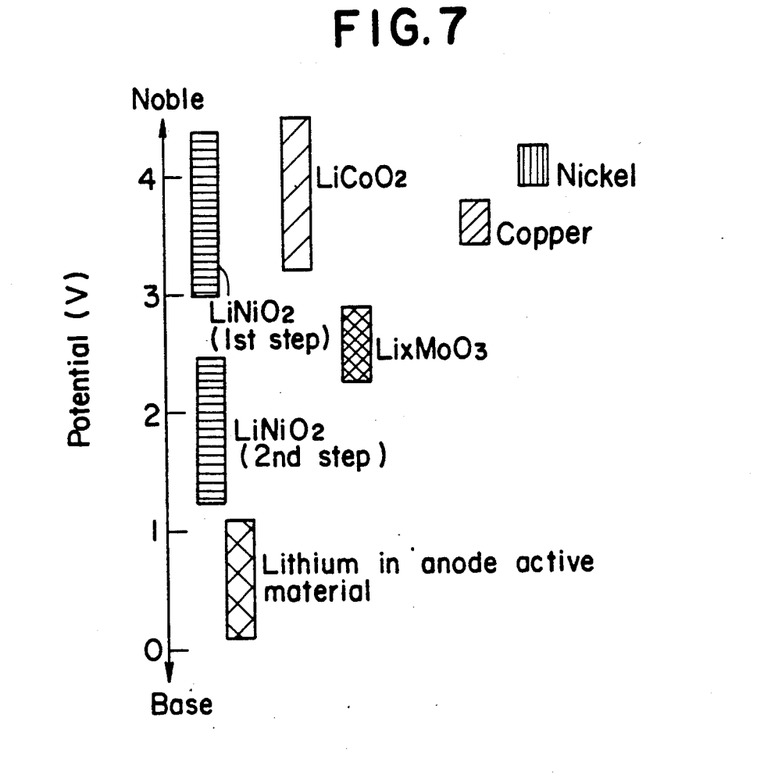
FIG. 7 is a graph showing the potential of lithium, $LiCoO_2$, $LixMoO_3$, and the anode current collector.

FIG. 7 shows the potential of lithium, $LiCoO_2$, and $Li_xMoO_3$ measured against a lithium reference electrode. The reason why the potential value has a certain range is that the potential of lithium contained in the anode active material is "base" when in the charged state and it changes toward "noble" as discharging takes place, whereas the potential of $LiCoO_2$ and $Li_xMoO_3$ is "noble" when in the charged state and it changes toward "base" as discharging takes place. Incidentally, FIG. 7 shows the potential of the anode current collector of copper or nickel measured against a lithium reference electrode. It is noted that $LiCoO_2$, $Li_xMoO_3$, and the anode current collector are markedly different from one another in potential.

For the sake of confirmation, the above-mentioned secondary batteries designated as A to G were disassembled and the anode current collector was examined for dissolution. No signs of dissolution were noticed.

The above-mentioned seven kinds of nonaqueous electrolyte secondary batteries designated as A to G underwent durability test which consists of repeating charging, overdischarging (down to 0 V), and standing for 24 hours. (Charging and overdischarging were performed under the same conditions as in the case shown in FIG. 3.) The battery was regarded as dead when the battery capacity decreased by half, and the number of cycles required for the battery to become dead was regarded as the number of repetitions of overdischarge permissible to the battery. The test results are shown in Table 2.

TABLE 2

| Battery | Permissible number of repetitions of overdischarge |
|---|---|
| A | 20 |
| B | 40 |
| C | 40 |
| D | 50 |
| E | 50 |
| F | 40 |
| G | 40 |

The above-mentioned nonaqueous electrolyte secondary battery would be satisfactory for practical use if it withstands about 10 times of repetitions of overdischarge, because it will scarcely happen that the overdischarged battery is left at 0 V for a long period time in an electronics machine such as VTR. Thus, it was confirmed that the primary active material is satisfactory for practical use if it is incorporated with more than 5 wt% of auxiliary active material.

Figure 8:
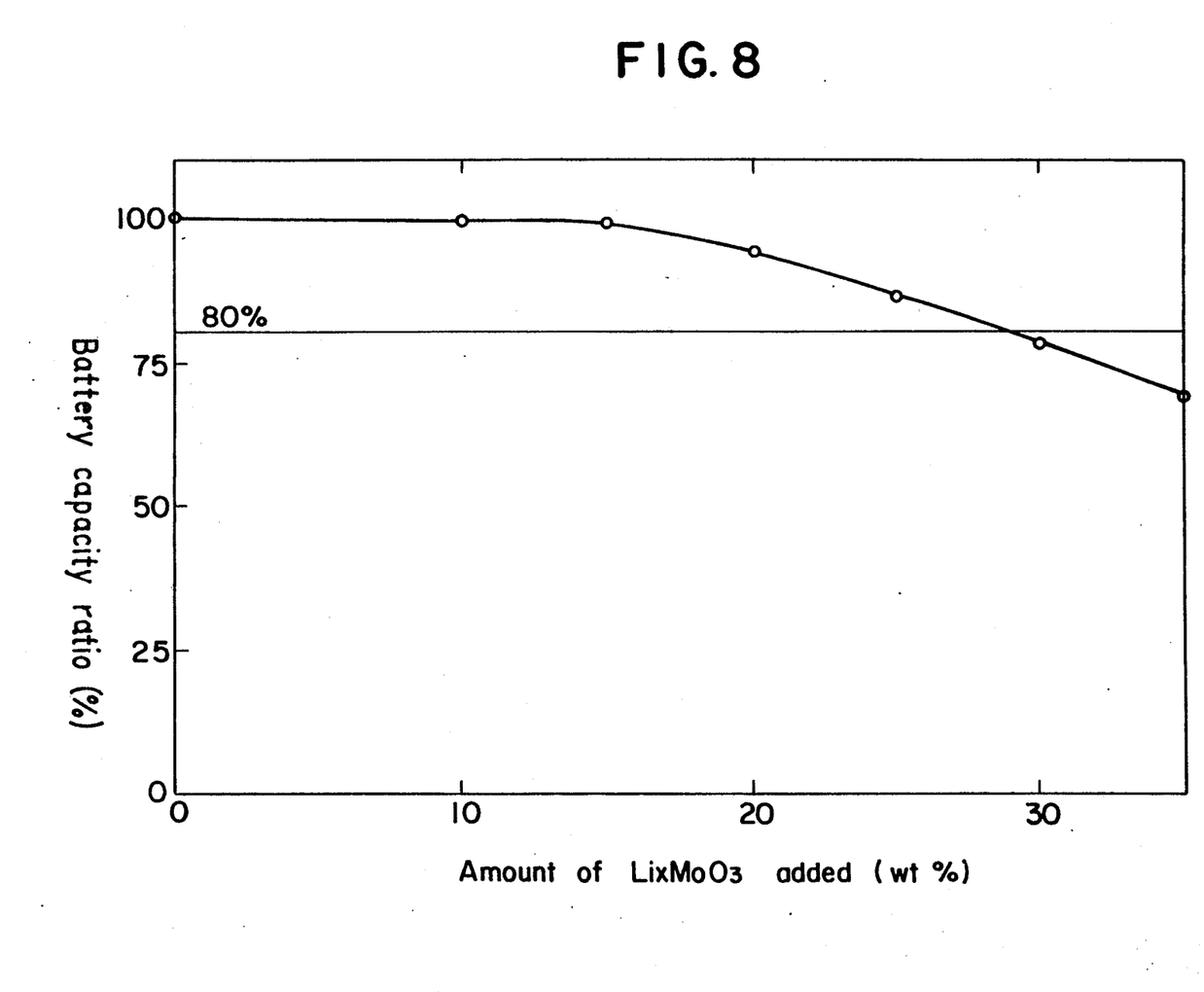
FIG. 8 is a graph showing the relation between the amount of $Li_xMoO_3$ added and the battery capacity.

FIG. 8 is a graph in which the amount of the auxiliary active material ($Li_xMoO_3$) added is plotted against the battery capacity in terms of ratio compared with that (100%) of the conventional battery without the auxiliary active material. It is considered that the battery would pose no problems in practical use if it has the battery capacity ratio of 80%. It is noted from FIG. 8 that the battery capacity ratio is about 70% when the auxiliary active material ($Li_xMoO_3$) is added in an amount of 35 wt%. In other words, the amount of the auxiliary active material should not exceed 35 wt%; otherwise, the resulting battery is superior in overdischarge performance but is poor in such properties as high potential and high battery capacity which are characteristic of secondary batteries. An amount less than 30 wt% is preferable, because the battery capacity ratio is higher than about 80% at that amount. An amount less than 20 wt% is more desirable, because the battery capacity ratio is higher than about 95% at that amount.

As mentioned above, when the cathode primary active material ($LiCoO_2$) is incorporated with the cathode auxiliary active material ($Li_xMoO_2$) in an amount of 1–30 wt%, preferably 2–20 wt%, the anode current collector does not dissolve even when the potential of the anode current collector (copper) shifts toward "noble", reaching the potential at which copper dissolves. Therefore the nonaqueous electrolyte secondary battery can undergo overdischarging without any practical problem. The addition of the auxiliary active material decreases the battery capacity; but the decrease is too small to cause a practical problem.

The cathode auxiliary active material ($Li_xMoO_3$) used in the present invention can be prepared in other processes; for example, by heating $Li^2CO^3$ and $WoO_3$ together.

EXAMPLE 2

In this example, a nonaqueous electrolytic secondary batteries were prepared in the same manner as explained in Example 1, except $Li_xNi_yCo_{1-y}O_2$ ($0 < x \leq 1$, $0.90 < y \leq 1.00$) was employed as the auxiliary cathode active material instead of $Li_xMoO_3$.

$Li_xNi_yCo_{1-y}O_2$ compounds were prepared by mixing lithium carbonate, nickel carbonate, and cobalt carbonate followed by sintering the resulting mixture with desired composition at 900° C. for 5 hours in electric furnace under oxygen atmosphere. Then sintered $Li_xNi_yCo_{1-y}O_2$ compounds were pulverized by an automatic mortar.

The following Table 3 shows the composition of samples and permissible number of repetitions of overdischarge.

TABLE 3

| Battery | Cathode composition | Permissible number of repetitions of overdischarge |
|---|---|---|
| H | $LiCoO_2$ 90 wt % + $LiNiO_2$ 10 wt % | 16 |
| I | $LiCoO_2$ 90 wt % + $LiNi_{0.95}Co_{0.05}O_2$ 10 wt % | 14 |
| J | $LiCoO_2$ 70 wt % + $LiNiO_2$ 30 wt % | 21 |
| K | $LiCoO_2$ 70 wt % + $LiNi_{0.95}Co_{0.05}O_2$ | 19 |

TABLE 3-continued

| Battery | Cathode composition | Permissible number of repetitions of overdischarge |
|---------|---------------------|---------------------------------------------------|
|         | 30 wt %             |                                                   |

The auxiliary active material $Li_xNi_yCo_{1-y}O_2$ ($0<x\leq 1$, $0.90<y\leq 1.00$) shows the 2 steps discharge characteristics of about 4.0 V at the initial discharge step and about 1.8 V at the final discharge step. At the final discharge step, the potential of $Li_xNi_yCo_{1-y}O_2$ is "base" as compared with the potential of the anode current collector as shown in FIG. 7. Thus, addition of the auxiliary active material works effective to overcome the problem caused by the overdischarge.

The present invention can be applied not only to the cylindrically wound secondary batteries as in the example but also to the square laminated secondary batteries and button-type or coin-type secondary batteries.

The present invention provides a new nonaqueous electrolyte secondary battery constructed as mentioned above. Owing to a carbonaceous material as the anode active material and a lithium compound incorporated into the cathode active material, it is superior in overdischarge performance.

We claim as our invention:

1. A nonaqueous electrolyte secondary battery comprising an anode having a carbonaceous material as an anode active material which permits lithium to be doped and undoped and an anode current collector, a cathode having a lithium compound as a cathode active material which permits lithium to be doped and undoped, and a nonaqueous electrolyte, characterized in that said cathode active material contains a primary active material of a first lithium compound having a potential which is more "noble" than a potential of said anode current collector and an auxiliary active material of a second lithium compound having the potential which is more "base" than the potential of the current collector.

2. A nonaqueous electrolyte secondary battery according to claim 1, wherein said primary active material is $Li_xCo_{1-y}Ni_yO_2$ where $0<x\leq 1$ and $0\leq y>0.50$.

3. A nonaqueous electrolyte secondary battery according to claim 2, wherein said primary active material is $Li_xCoO_2$.

4. A nonaqueous electrolyte secondary battery according to claim 1, wherein said auxiliary active material is complex oxide of lithium and molybdenum.

5. A nonaqueous electrolyte secondary battery according to claim 1, wherein said auxiliary active material is $Li_xCo_{1-y}Ni_yO_2$ where $0<x\leq 1$ and $0.9<y\leq 1.0$.

6. A nonaqueous electrolyte secondary battery according to claim 1, wherein an anode having said carbonaceous material and said anode collector and a cathode having said cathode active material are wound with a separator interposed between said anode and cathode.

* * * * *